A. R. GROTZ.
BLOW MOLD FOR GLASSWARE.
APPLICATION FILED NOV. 5, 1912.

1,129,668.

Patented Feb. 23, 1915.

WITNESSES:
F. E. Arthur
J. K. Lee

INVENTOR—
Albert R. Grotz.
BY
N. E. Dunlap
ATTORNEY.

UNITED STATES PATENT OFFICE.

ALBERT R. GROTZ, OF WELLSBURG, WEST VIRGINIA.

BLOW-MOLD FOR GLASSWARE.

1,129,668.  Specification of Letters Patent.  Patented Feb. 23, 1915.

Application filed November 5, 1912. Serial No. 729,610.

*To all whom it may concern:*

Be it known that I, ALBERT R. GROTZ, a citizen of the United States of America, and resident of Wellsburg, county of Brooke, and State of West Virginia, have invented certain new and useful Improvements in Blow-Molds for Glassware, of which the following is a specification.

This invention relates to improvements in glass molds, and more particularly to an improved type of blow mold for glassware.

The object of this invention is to provide means whereby the production of glassware having at one side an undue thickness of glass, known to the trade as a "heel-tap", is prevented.

In the manufacture of blown glass globes and the like, the blank to be blown is first pressed and is then introduced in the blow-mold. Unless handled with skill or special care, the blank is likely, owing to the plastic condition of the glass, to become bent or more or less distorted, so that, when inserted in the blow-mold in the usual manner, it will hang in a non-vertical position. The result is that the glass is not equally distributed in the blowing operation—that is, the blown article is formed with one side of undue thickness. To obviate this undue thickness, or heel-tap formation, is therefore one of the objects of the present invention, and this is accomplished by the provision of means whereby the pressed glass blank is automatically centered in the blow-mold prior to the blowing operation.

The invention resides in the features of construction, arrangement of parts, and combinations of elements which will hereinafter be fully described, reference being had to the accompanying drawings, forming a part of this specification, in which—

Figure 1:
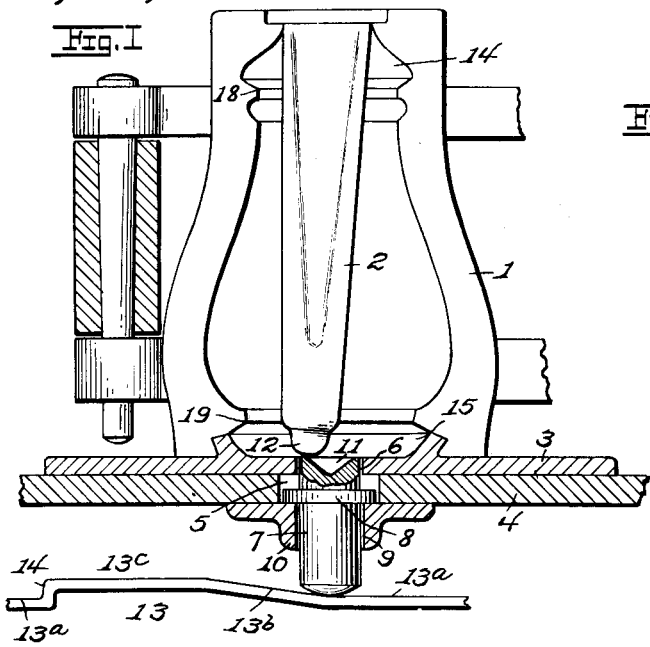
Figure 3:
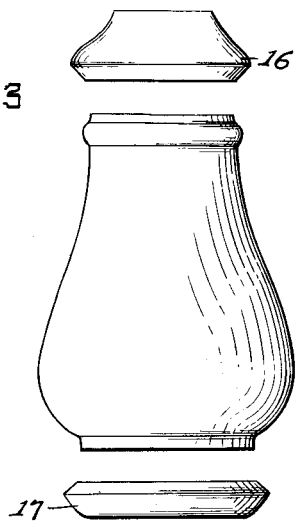
Figure 2:
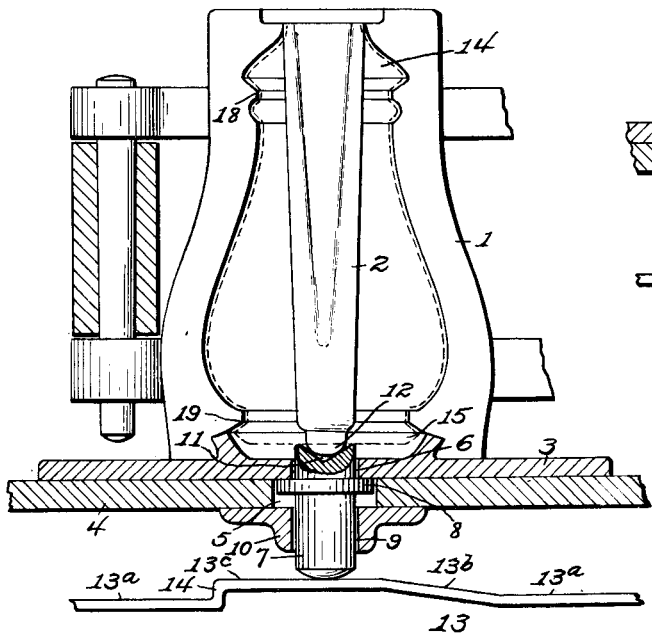
Figure 4:
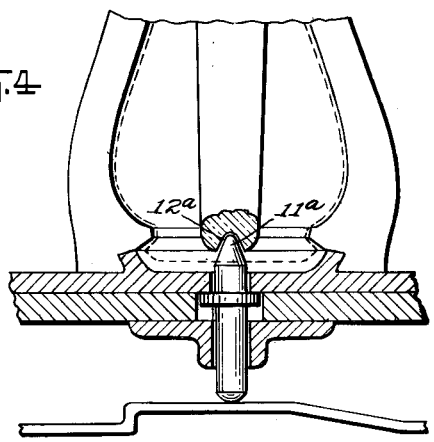

Figure 1 is a sectional view of a mold embodying my invention, a pressed glass blank being shown mounted therein in a non-vertical position; Fig. 2 is a similar view showing the plunger elevated and the blank centered in the mold; Fig. 3 is a side elevation of a lantern globe of a common type formed in the mold, showing the "bust off" portions detached; and Fig. 4 is a view similar to Fig. 2, showing a modified form of plunger.

Referring to said drawings, in which like designating characters distinguish like parts throughout the several views—1 indicates one of the sections of a sectional blow-mold, and 2 a pressed glass blank of a common form suspended in said mold. The usual bottom plate 3 upon which the sections of the mold are seated is mounted upon a rotary table 4 in the usual manner. Operating vertically through alined apertures or orifices 5 and 6 provided respectively in said table and said bottom plate at a point located centrally with respect to the interior of the mold is a plunger 7 having a fixed annular flange or collar 8. The aperture 5 is of larger size than the aperture 6 and is also larger than the aperture 9 provided in a collar or boss 10 attached to the under side of said table and through which the stem of said plunger 7 operates; thus, the range of vertical movement of said plunger is limited to the difference between the thickness of the table and that of the collar 8.

The upper end of the plunger 7 is provided, preferably, with a more or less shallow cup-like depression 11, as shown in Figs. 1 and 2, adapted to receive the tapered or rounded lower end 12 of the blank 2 for maintaining the latter in a central vertical position in the mold. If desired, the upper end of the plunger may be upwardly tapered, or conical, as shown at 11ª in Fig. 4, in which case the blank is formed with a depression 12ª of a substantially corresponding conical form. The lower end of the plunger projects outward from the collar or boss 10 and rests upon an irregular bar or track 13 which is so disposed with respect to the table 4 that, throughout the rotary movement of the latter, said plunger travels thereon.

Prior to the commencement of the rotary movement of the table, which movement is preceded by the introduction of a blank 2 in the mold, the lower end of the plunger rests upon a horizontally disposed portion 13ª of said track, which portion is so spaced from the table as to allow the plunger to remain wholly withdrawn from the mold, as shown in Fig. 1. Immediately movement of the table commences, the lower end of the plunger passes to an upwardly inclined portion 13ᵇ of said track, and, as movement continues, the plunger is gradually elevated until it mounts upon an elevated horizontal portion 13ᶜ of said track. The plunger is designed to engage, during its elevating movement, the lower end of a non-vertical blank and to automatically move the latter to a vertical centered position, as shown in Figs. 2 and 4, and to maintain the same in such position during the blowing operation. At the point in the operation where the blowing is finished, the plunger passes over an abrupt ledge 14 in the track and drops by gravity to a second horizontal portion 13ª of the track, allowing the mold to be again employed in a second blowing operation in which the plunger is automatically operated a second time in the manner above described, and so on.

Having thus described my invention, what I claim as new, and desire to secure by Letters Patent, is—

1. The combination with a rotary table, of a sectional blow-mold mounted on said table, said mold being designed to receive therein in a suspended position a pressed blank, a plunger adapted to be elevated through said table into engagement with the lower end of such blank for positioning the latter at the center of the mold, and means for elevating said plunger.

2. The combination with a rotary table, of a sectional blow-mold mounted on said table, said mold being designed to receive therein in a suspended, non-mold-engaging position a pressed blank, a plunger operating through the bottom of said mold for engaging such blank and positioning the latter at the center of the mold, and means for elevating said plunger.

3. The combination with a rotary table, of a sectional blow-mold mounted on said table, said mold being designed to receive therein in a suspended, non-mold-engaging position a pressed blank, a plunger operating through the bottom of said mold for engaging and positioning the blank at the center of the mold, and means for automatically actuating said plunger at predetermined intervals in the rotation of said table.

4. The combination with a rotary table, of a sectional blow-mold mounted on said table, said mold being designed to receive therein in a suspended position a pressed blank having a rounded end, a plunger having a depression in its end for the reception of the rounded end of the blank, said plunger being adapted to be elevated through said table into engagement with the blank for positioning the latter at the center of the mold, and automatic means for elevating said plunger at predetermined intervals in the rotation of said table.

5. The combination with a rotary table, of a sectional blow-mold mounted on said table, said mold being designed to receive therein a pressed blank of less diameter than the internal diameter thereof, a bottom plate for said mold, and a plunger adapted to be elevated through said table and said bottom plate into engagement with such blank for positioning the latter at the center of the mold, said plunger being of less diameter than the internal diameter of the lower end of said mold.

In testimony whereof, I affix my signature in presence of two subscribing witnesses.

ALBERT R. GROTZ.

Witnesses:
WILLIAM SHUEY,
JAS. A. FRANK.